Nov. 3, 1970     G. A. BREWER     3,537,304
TORQUEMETER
Filed Aug. 13, 1968     2 Sheets-Sheet 1
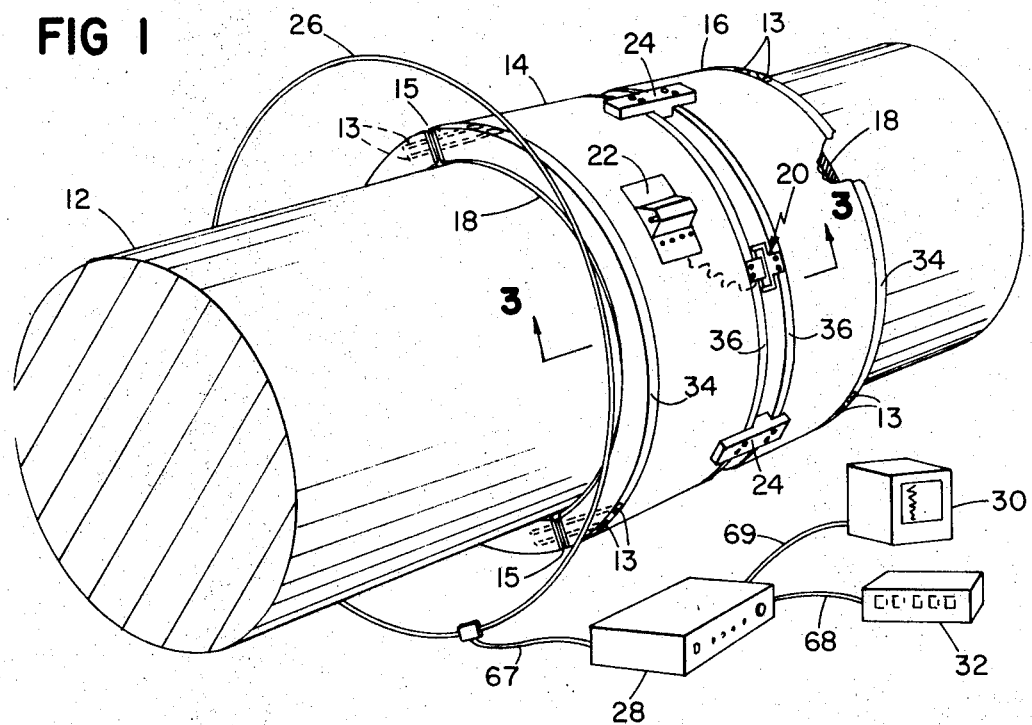
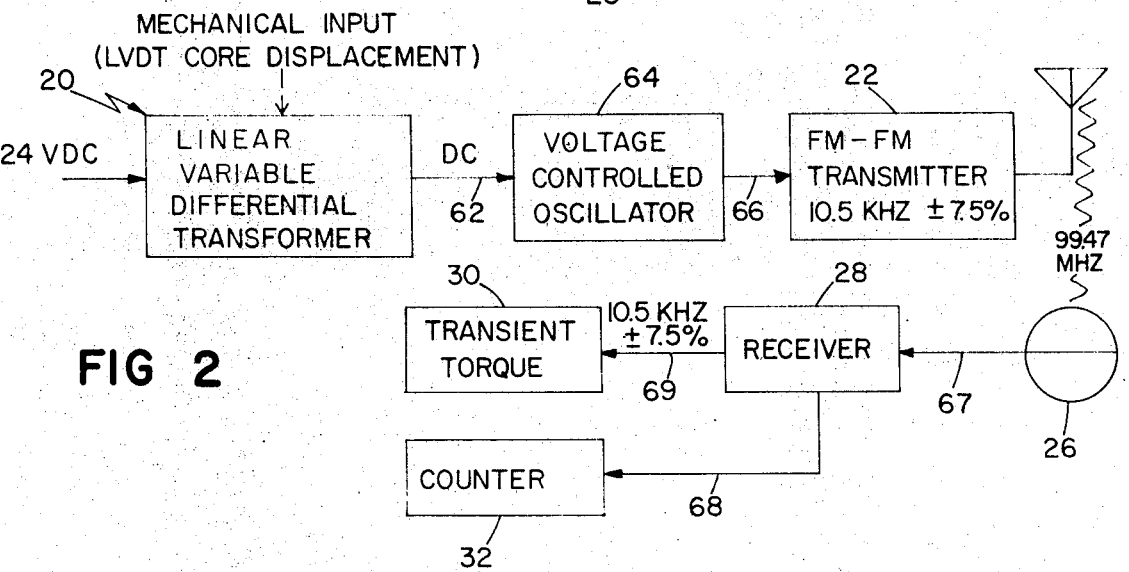
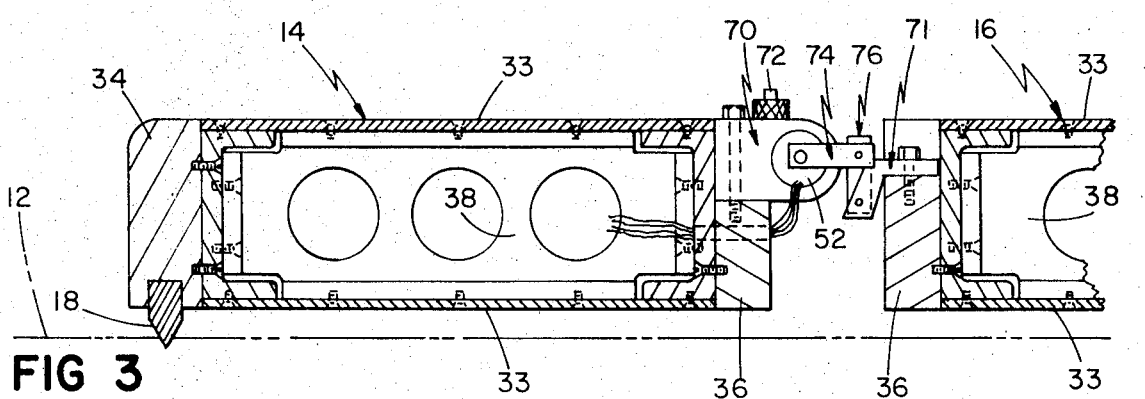

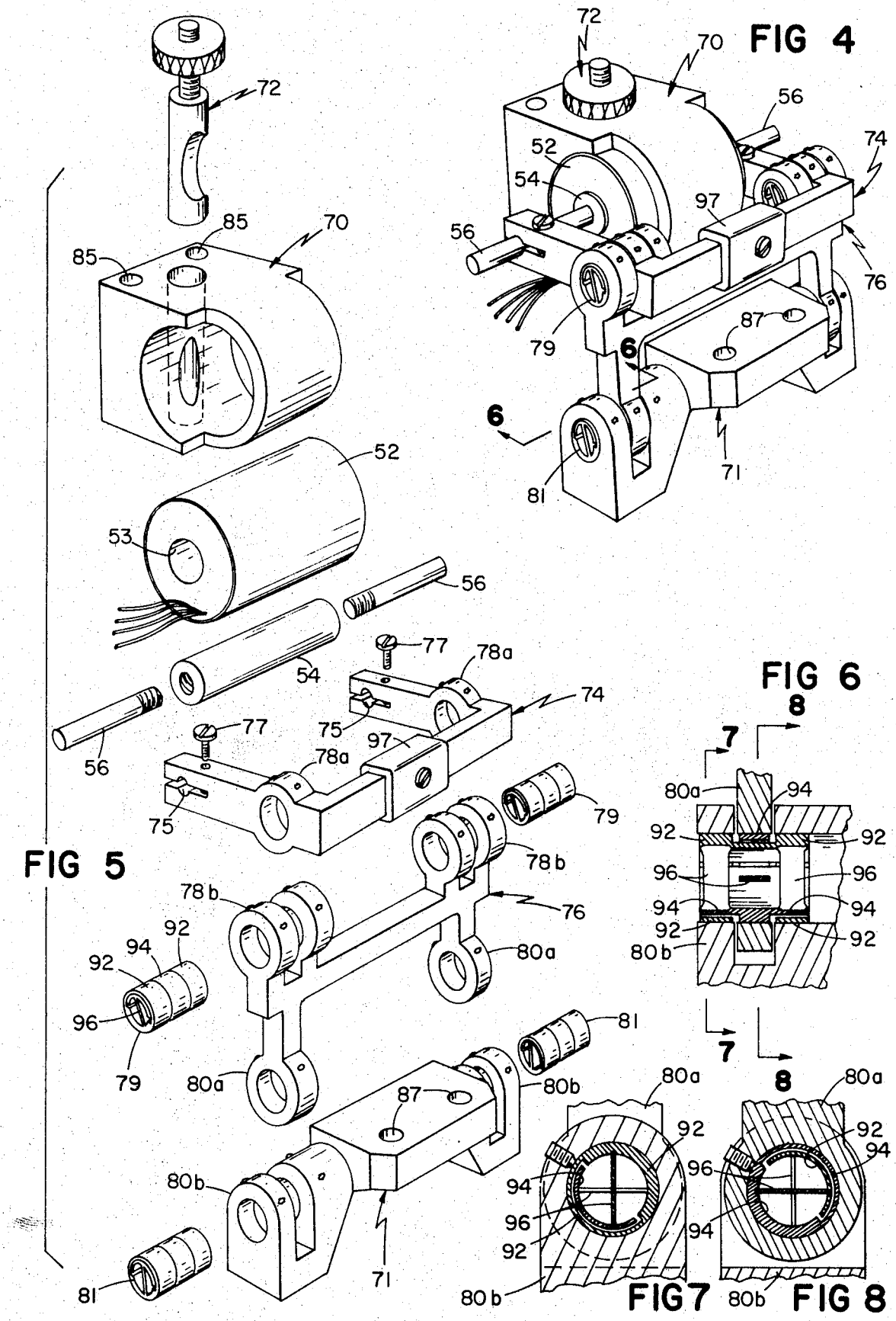

United States Patent Office 3,537,304
Patented Nov. 3, 1970

3,537,304
TORQUEMETER
Given Ankeny Brewer, Marion, Mass., assignor to Brewer Engineering Laboratories, Inc., Marion, Mass., a corporation of Massachusetts
Filed Aug. 13, 1968, Ser. No. 752,297
Int. Cl. G01l 3/10
U.S. Cl. 73—136            9 Claims

ABSTRACT OF THE DISCLOSURE

Accurate measurement of both average and transient torque is provided by a linear variable differential transformer mounted to a rotating shaft by a suspension allowing free radial and axial movement yet preventing unwanted torsional deflection.

---

This invention relates to torque measurement by sensing the torsional shear deformation of a rotating shaft with a linear variable differential transformer (LVDT).

It is a primary object of the invention to provide an LVDT torquemeter capable, even when measuring the torque applied to shafts of large diameter, of indicating both steady and transient torques with great accuracy and reliability. Other objects are to provide such a torquemeter that consumes less power and is lighter in weight than air-gap magnetic torquemeters, that can produce an accessable readout without use of slip-rings, that is much easier to calibrate than shaft-permeability torquemeters, and that may, unlike strain gage torquemeters, be readily removed from the shaft and subsequently reattached without any requirements for recalibration.

In preferred embodiments there is featured a pair of light but extremely rigid annular husks or shells clamped, at axially spaced planes, to the shaft on which the torque to be measured is exerted, and an LVDT suspended from these shells so as to permit the LVDT core freedom of axial and radial motion with respect to the shaft, while effectively constraining the LVDT core from any circumferential motion relative to the shell from which it is suspended.

Other objects, features, and advantages will appear from the following description of a preferred embodiment of the invention taken together with the attached drawings thereof in which:

FIG. 1 is a perspective view of the torquemeter mounted upon a large-diameter shaft;

FIG. 2 is a block diagram of the electronic components of the torquemeter;

FIG. 3 is a sectional view of the torquemeter shells and the suspended LVDT taken at 3—3 of FIG. 1;

FIG. 4 is a perspective view of the LVDT and its suspension;

FIG. 5 is an exploded perspective view of the LVDT and its suspension;

FIG. 6 is a sectional view of one of the four flexure pivots of the LVDT suspension taken at 6—6 of FIG. 4;

FIG. 7 is an end view of the same pivot taken at 7—7 of FIG. 6; and

FIG. 8 is another sectional view of the same pivot taken at 8—8 of FIG. 6.

Referring more particularly to the drawings, in FIG. 1 the torquemeter is shown attached to a large shaft 12, for example the 24-inch-diameter roll drive spindle on a 120-inch aluminum rolling mill (subject to torques on the order of ten million pound-inches). The torquemeter includes two split-annular shells 14 and 16 clamped to the shaft at circumferential knife edges 18. The knife edges are located adjacent the outer axial extremities of the shells; their axial separation is 24 inches. The two shells effectively concentrate the torsional strain occurring over this relatively long section of the shaft at the LVDT transducer 20. Shaft torsional shear deformation between the knife edges is sensed by the LVDT which produces a proportional D.C. output voltage to modulate the output transmission of telemetry transmitter 22. The transmitter output is received at loop antenna 26 and applied to receiver 28. The receiver in turn drives both an oscilloscope 30 (or other indicating device) to provide a real-time indication of transient torque and an electronic counter 32 (for an integrated measure of average torque over a known interval).

The shells 14 and 16 utilize aircraft-type construction to provide a maximum stiffness/weight ratio. Each shell is constructed of 6061–T6 aluminum alloy utilizing a reinforced double stress skin with braced skins 33 mounted between outer and inner heavy end rings 34 and 36, these end rings being joined to axial I-braces 38. Preferably, the entire shaft-mounted assembly is dynamically balanced to avoid inducing shaft-vibration; telemetry transmitter 22 is located about 180° from its battery pack (not shown) and suitable counterweights are secured to the interior of the shells. Each shell weighs approximately 30 pounds and has a very high degree of rigidity, the first-mode torsional vibration frequency being about 950 c.p.s., which, if undamped, would allow torsional frequencies of 100 c.p.s. to be measured with only 1% deviation from flat response. The mass moment of inertia about the center of rotation of each shell is approximately 25.5 inch-pound-second$^2$.

The clamping pressure of knife edges 18 against the surface of shaft 12 is controlled by ½-inch diameter shear-line bolts 13 and shim stacks 15. The knife edges are of flame-hardened steel and are fitted into the heavy outer aluminum rings 34 adjacent the axially outer extremities of the shells. The thickness of shim stacks 15 and the torque applied to shear-line bolts 13 adjusts the clamping force on the shaft and compensates for any variation in shaft diameter. To ensure a positive slip-free grip, enough clamping pressure is applied to the knife edges to cause them to indent into the shaft surface. To realize the maximum clamping pressure, most of the bolt torque load should be used to seat the knife edges and only a small proportion (as near as can be had to ten percent) of the load should be used for clamping the rings together with a zero gap at the shims. Inclusion of a 0.30 inch aluminum insert in the shim stack is helpful to improve the flexibility of adjustment with respect to variation in shaft diameter. Shipping locks 24 secure corresponding halves of the two shells 14 and 16 together during shipping and installation of the torquemeter; these locks are removed prior to use of the system.

The LVTD displacement transducer is best seen in FIG. 5; it consists of an annular coil assembly 52 having a central cylindrical core passage 53 extending from end to end. Magnetic core 54 is inserted in passage 53 and is axially slidable within the passage. Extension rods 56 are secured to the ends of core 54 and transmit to its axial motions. The LVDT is a D.C. input, D.C. output, differential transformer having a built-in carrier-oscillator and a phase-sensitive demodulator providing a D.C. output prorotional to the linear displacement of core 54; full scale displacement is normally ±0.10 inch. The LVDT used in the preferred embodiment is manufactured by the Sanborn Division of the Hewlett-Packard Company, and is designated as Model No. 24DCT–100.

The D.C. output of the LVDT (see FIG. 2) is applied through line 62 to a voltage controlled oscillator 64 (VCO) to frequency modulate the VCO center frequency of 10.5 kHz. ±7.5% full-scale devation. The VCO output is in turn applied through line 66 to a low-power, solid-state FM/FM telemetry transmitter 22 (housed in shell 14) and frequency modulates the 99.47 mHz. transmitter output frequency. A center frequency adjustment is provided to control the unmodulated center frequency of the VCO. For torque-reversing applications, it is adjusted at 10.5 kHz. (±0.10 inch LVDT deflection), and, for nonreversing torque applications of large deflections exceeding 0.10 inch, the center frequency is adjustable to each end (±7.5%) of the 10.5 kHz. center frequency, to provided, for example, for a 0 to 0.20 inch LVDT deflection.

The LVDT produces a relatively high level output signal which is normally attenuated. If increased sensitivity is required, the degree of attenuation can be reduced to provide a maximum sensitivity of approximately ±0.023-inch full scale. A battery power supply (not shown) is also included within the shell 14 and contains two nickel-cadmium packs that supply 30 v. for the transmitter and 24 v. for the LVDT. The batteries have an ampere-hour rating of 1.2, sufficient to operate the torquemeter for about 16 hours without recharging.

The transmitter output is received by a loop antenna 26 which should encircle the torquemeter in such a position that the transmitting antenna of telemetry transmitter 22 has line-of-sight visibility from the receiving antenna; the transmitting and receiving antennas should be in close proximity to each other. Preferably, receiving antenna 26 is of flexible construction so that neither it nor the rotating components of the torquemeter system will be damaged in the event of accidental contact.

The loop antenna 26 applies the received signal through line 67 to a receiver 28 consisting of a standard broadcast (88–108 mHz.) solid-state FM tuner and frequency discriminator. The tuner output at line 68 duplicates the audio VCO output signal (normally 10.5 kHz. ±7.5%) and may be monitored directly, for example by a counter 32, to provide an integrated measure of average torque over a given time interval. The discriminator output, applied to line 69, is available at two impedance levels: a high impedance for driving an oscilloscope 30 or a voltmeter, and a low impedance for driving a galvanometer. The discriminator output provides a fast-response real-time indication of the transient torque applied to shaft 12.

The LVDT transducer and its suspension are shown in FIG. 4, and (in exploded view) in FIG. 5. The LVDT core 54 slides in core passage 53 of coil assembly 52 with very little clearance; the absence of any appreciable air gap is one factor which permits the LVDT to produce an accurate high-level output signal with very little power consumption. However, the close fit of the core and coil assembly creates serious mechanical problems when the LVDT is used as a torquemeter. For accurate response, particularly to short transient fluctuations in torque, it is imperative that mechanical hysteresis be minimized by avoiding friction between the core and the coil assembly. Because the forces applied to the torquemeter are often numerous, it is essential that the core motion be almost exactly parallel to the axis of the coil assembly. Any relative motion of the core with respect to the coil assembly along components radial or axial to the shaft 12 could be at the very least cause the core to bind in the coil assembly, and if the excursion were sufficient might easily damage or destroy the LVDT.

The LVDT suspension shown in FIGS. 4 and 5 is designed to accurately couple any relative circumferential motion of shells 14 and 16 to the coil assembly and core respectively of the LVDT while yet allowing the core complete freedom of motion with respect to shell 16 in both the radial and axial directions. The torsional shear deformation of the shaft 12 can be accurately determined by sensing only the relative circumerential motions of the knife edges 18 (transmitted with no appreciable distortion through the highly rigid shells 14 and 16 to the LVDT coil assembly and core). Relative motion of the shells 14 and 16 along components radial to the shaft or axial to it may be produced, for example, by transverse shaft vibrations (or by other shaft deformations unrelated to the torsional shear deformation to be measured). The isolation of such unwanted components of relative motion from the LVDT transducer ensures that the core is free to move, tangentially (parallel to its own axis) without appreciable friction within the coil assembly, thus avoiding mechanical hysteresis and faithfully reflecting by its current displacement the true present value of shaft torsional shear deformation (a quantity linearly related to the applied torque).

Referring to FIGS. 4 and 5, the LVDT coil assembly 52 is mounted in adjustable core-support block 70 and secured by a thumbscrew jam lock 72. Core-support block 70 is itself securely bolted to inner end ring 36 of shell 14 (through holes 85). This mounting holds coil assembly 52 fixed with respect to shell 14, and, owing to the great rigidity of shell 14, accurately transmits the angular position of knife edge 18 (of shell 14) to the coil assembly. A given circumferential movement of the knife edge will not produce exactly the same amplitude of linear movement of the coil assembly, but rather will produce a slightly greater linear movement because the coil assembly axis is raised somewhat above the shaft surface and consequently is at a slightly greater radius than the knife edge from the axis of shaft 12. However, this effect is entirely linear, and, since it is precisely offset by choice of the correct calibration constant, introduces no error whatever in the final torque measurement.

Core 54 is inserted in core passage 53 of the coil assembly with extension rods 56 secured to the ends of the core. These rods connect the core to radial-freedom yoke 74 when locked in split holes 75 with screws 77. (By loosening these screws, the no-load core position can be accurately preset with a micrometer.) Preferably, radial-freedom yoke 74 is counterweighted, for example with weight 97, to prevent any net radial force from acting on core 54 owing to accelerations produced by shaft rotation.

Radial-freedom yoke 74 is pivoted at gudgeons 78a to radial trunnions 78b of axial-freedom yoke 76 by means of flexure pivots 79. These pivots allow limited but very low-hysteresis rotation of radial-freedom yoke 74, thereby permitting core 54 to remain radially centered within core passage 53 of coil assembly 52 despite any radial movement of shell 16 with respect to shell 14.

Axial-freedom yoke 76 is in turn pivoted at gudgeons 80a to axial trunnions 80b of core-support block 71 by means of flexure pivots 81. These pivots permit core 54 to remain axially centered (i.e. axially with respect to shaft 12) within core passage 53 despite any axial movement of shell 16 with respect to shell 14. The coil-support block 71 is bolted to inner end ring 36 of shell 16 (through holes 87). This mounting holds core assembly 54 circumferentially fixed with respect to shell 16, and owing to the great rigidity of shell 16, accurately transmits the angular position of knife edge 18 of shell 16 to the core assembly.

The four flexure pivots 79 and 81 used in the preferred embodiment are manufactured by the Bendix Corporation and are designated as Free Felx® Pivot, Bendix Part No. 6008-600. The diameter of each pivot is ¼ inch and its axial length is ⅜ inch. As best seen in FIG. 5, the axial surface of each pivot is divided into three cylindrical segments. The two outer segments are integral parts of a single member 92, and the central segment is an integral part of another member 94. Member 94 is capable of limited rotation with respect to member 92 about the axis of the pivot subject only to the elastic restoring force of the interior spring elements 96. The detailed structure of the pivot is best seen in FIGS. 6, 7, and 8. Each pivot is secured within the corresponding gudgeon and trunnions by machine screws.

In operation, the audio output frequency of VCO 64 on line 66 and the identical tuner output on line 68 will differ from the pre-established center frequency by an amount directly proportional to the linear displacement of the LVDT core 54 from its center (no load) position. The constant proportionality depends upon the preselected sensitivity, determined, for example, as previously described by adjusting the attenuation of the LVDT output. (This constant may be exactly measured by applying a known displacement to the LVDT core with a micrometer while monitoring the resulting audio frequency.

The applied torque is in turn directly proportional to the LVDT displacement. This second constant of proportionality can be calculated from the modulus of elasticity and physical dimensions of the shaft, or may be empirically determined by applying a known torque to the shaft and measuring the resulting LVDT displacement.

Other embodiments within the scope of the following claims will occur to those skilled in the art.

What is claimed is:

1. A torquemeter for sensing torsional deformation of a shaft comprising:
   a transducer having first and second transducer elements relatively movable along a transducer axis oriented substantially tangentially to said shaft to produce a transducer output signal responsive to the amplitude of relative movement;
   first and second rigid members respectively secured to said shaft at axially spaced first and second positions;
   said first transducer element attached by a first mounting to said first rigid member;
   said second transducer element attached by a second mounting to said second rigid member;
   at least one of said first and said second mountings comprising pivot means permitting relative movement of the associated secured member and attached element along directions radial and axial to said shaft;
   said first and said second mountings each comprising means constraining relative movement of the associated secured member and attached element along said transducer axis.

2. The torquemeter of claim 1 comprising transmitting means responsive to said transducer output signal and receiving means unconnected to said shaft and responsive to the output of said transmitting means.

3. The torquemeter of claim 2 wherein:
   said transmitting means comprises a voltage controlled oscillator and an FM/FM transmitter;
   and said receiving means comprises a loop antenna at least partially surounding said shaft, an FM tuner, and means for visually displaying the output of said tuner.

4. The torquemeter of claim 3 wherein said receiving means further comprises a discriminator and means for visually displaying the output of said discriminator.

5. A torquemeter for sensing torsional deformation of a shaft comprising:
   a linear variable differential transformer having a coil assembly and a core relatively movable along an LVDT axis oriented substantially tangentially to said shaft to produce an output signal responsive to the amplitude of relative movement;
   first and second rigid members respectively clamped to said shaft by knife edges disposed to intersect the surface of said shaft at axially spaced planes substantially normal to the longitudinal axis of said shaft;
   said coil assembly attached by a first mounting to said first rigid member;
   said core attached by a second mounting to said second rigid member;
   at least one of said first and said second mountings comprising a suspension permitting relative movement of the associated secured member and attached element along directions radial and axial to said shaft; said suspension comprising:
     a first pivoted member pivotally mounted to said clamped rigid member upon a first axis;
     a second pivoted member pivotally mounted to said first pivoted member upon a second axis;
   said first mounting comprising means constraining said coil assembly from movement relative to said first rigid member along a direction parallel to said LVDT axis;
   said second mounting comprising means constraining said core from movement relative to said second rigid member along a direction parallel to said LVDT axis.

6. A torquemeter for sensing torsional deformation of a shaft comprising:
   a linear variable differential transformer having an annular coil assembly and a concentric core relatively movable along an LVDT axis oriented substantially tangentially to said shaft to produce an electrical output signal responsive to the amplitude of relative movement;
   first and second axially split rigid shells of hollow skin-stressed construction respectively clamped to said shaft by knife edges of sufficient hardness to indent into the surface of said shaft, said knife edges disposed to intersect the surface of said shaft at axially spaced planes substantially normal to the longitudinal axis of said shaft;
   said coil assembly fixedly attached to said first rigid shell,
   said core attached to said second rigid shell by a suspension permitting relative movement therebetween along directions radial and axial to said shaft and preventing relative movement therebetween along a direction to said LVDT axis;
   said suspension comprising:
     a first pivoted member pivotally mounted to said second shell by flexure pivots upon a first axis generally parallel to said LVDT axis;
     a second pivoted member pivotally mounted to said first pivoted member by flexure pivots upon a second axis generally parallel to said first axis;
     said first and said second pivoted members being dynamically balanced to minimize net radial forces upon said core when said shaft is rotated.

7. The torquemeter of claim 6 wherein said first and said second axially split rigid shells each comprise two semi-annular sections joined by shear-line bolts at two axial shear lines containing compressible shim stacks.

8. The torquemeter of claim 6 wherein said first and said second rigid shells are fabricated principally of materials selected from the class of aluminum and alloys of aluminum.

9. The torquemeter of claim 6 wherein said first and said second rigid shells are dynamically balanced about the longitudinal axis of said shaft.

References Cited

UNITED STATES PATENTS

| 2,949,029 | 8/1960 | Bayles et al. | 73—136 |
| 3,229,514 | 1/1966 | Williams | 73—136 |

FOREIGN PATENTS

| 762,668 | 12/1956 | Great Britain. |
| 997,723 | 7/1965 | Great Britain. |
| 1,063,829 | 3/1967 | Great Britain. |

CHARLES A. RUEHL, Primary Examiner

U.S. Cl. X.R.

336—30